US008500435B2

(12) United States Patent  (10) Patent No.: US 8,500,435 B2
Neter et al.  (45) Date of Patent: Aug. 6, 2013

(54) POSITIONING DEVICE

(75) Inventors: Witold Neter, Newnan, GA (US);
Helmut Thoemmes, Kastel (DE);
Christian Wagner, Mainz (DE)

(73) Assignee: MHT Mold Hotrunner Technology AG, Hochheim (DE)

( * ) Notice: Subject to any disclaimer, the term of this patent is extended or adjusted under 35 U.S.C. 154(b) by 624 days.

(21) Appl. No.: 12/308,437

(22) PCT Filed: Jun. 1, 2007

(86) PCT No.: PCT/EP2007/055428
§ 371 (c)(1),
(2), (4) Date: Aug. 9, 2010

(87) PCT Pub. No.: WO2007/147718
PCT Pub. Date: Dec. 27, 2007

(65) Prior Publication Data
US 2010/0297275 A1  Nov. 25, 2010

(30) Foreign Application Priority Data
Jun. 20, 2006  (DE) .......................... 10 2006 028 723

(51) Int. Cl.
*B29C 49/64* (2006.01)
(52) U.S. Cl.
USPC .......................... 425/446; 425/526; 425/547
(58) Field of Classification Search
USPC .................................. 425/445, 446, 526, 547
See application file for complete search history.

(56) References Cited

U.S. PATENT DOCUMENTS

| 5,772,951 A | * | 6/1998 | Coxhead et al. ............. 264/537 |
| 5,837,299 A | | 11/1998 | Bright et al. |
| 6,139,789 A | * | 10/2000 | Neter et al. .................... 264/535 |
| 6,145,225 A | * | 11/2000 | Ritchey .......................... 40/301 |
| 6,296,473 B1 | * | 10/2001 | Ohlmann ....................... 425/547 |
| 6,652,262 B2 | * | 11/2003 | Kroeger ........................ 425/556 |
| 2005/0042324 A1 | * | 2/2005 | Unterlander et al. ......... 425/547 |

FOREIGN PATENT DOCUMENTS

| DE | 19527756 A1 | 2/1996 |
| EP | 1621318 A1 | 2/2006 |
| JP | 2000108170 A | 4/2000 |
| WO | WO 03/097326 A1 | 11/2003 |
| WO | WO 03/097376 A1 | 11/2003 |

* cited by examiner

*Primary Examiner* — Robert B Davis
(74) *Attorney, Agent, or Firm* — Michael L. Dunn

(57) ABSTRACT

A system for the after-treatment of parisons (7) produced in an injection molding mold, comprising at least two after-treatment tools. To provide a system for the after-treatment of parisons produced in an injection molding mold, by means of which a plurality of after-treatment tools can be easily positioned, it is proposed in accordance with the invention that there is provided a positioning device for positioning the first after-treatment tool in at least one positioning direction, and the at least two after-treatment tools are connected together so that with the positioning device for positioning the first after-treatment tool at least one further after-treatment tool can be positioned by suitable positioning of the first after-treatment tool.

14 Claims, 17 Drawing Sheets

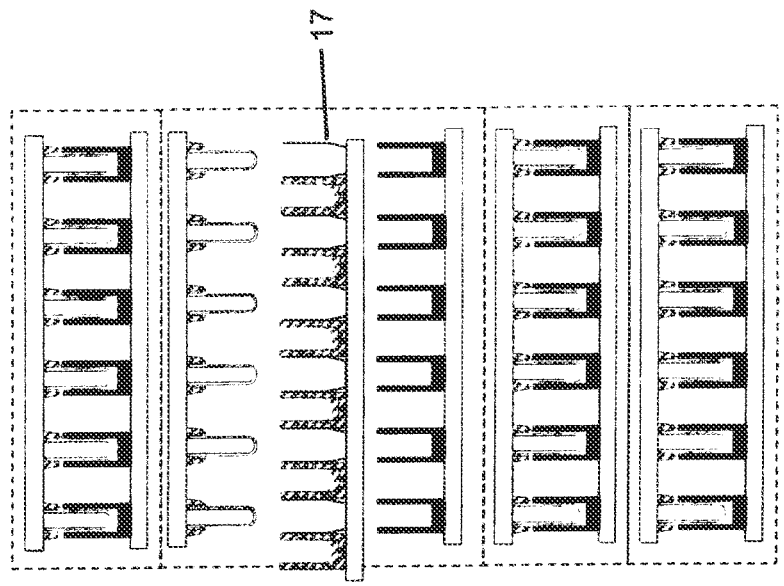
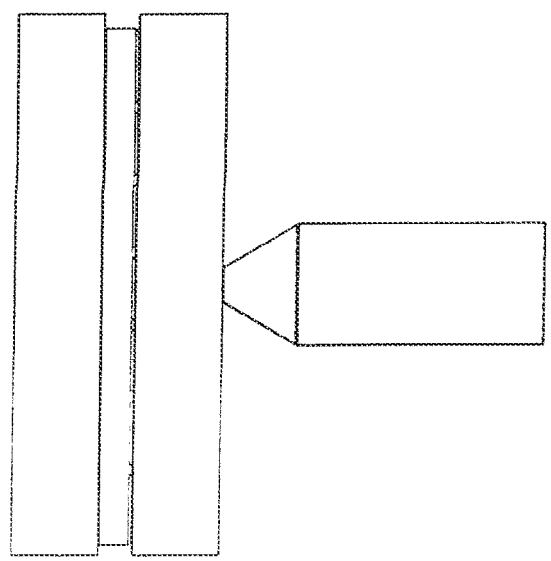
Figure 6

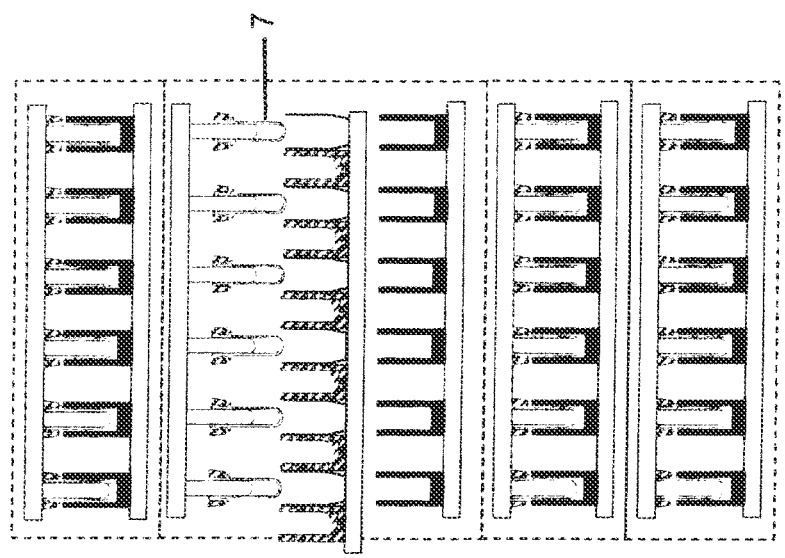
Figure 7
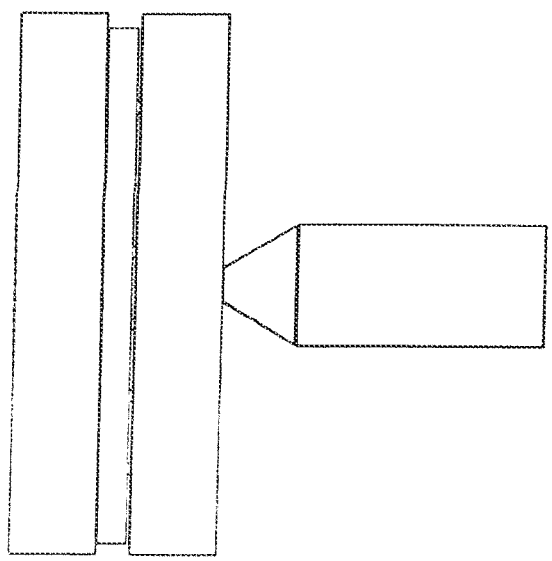

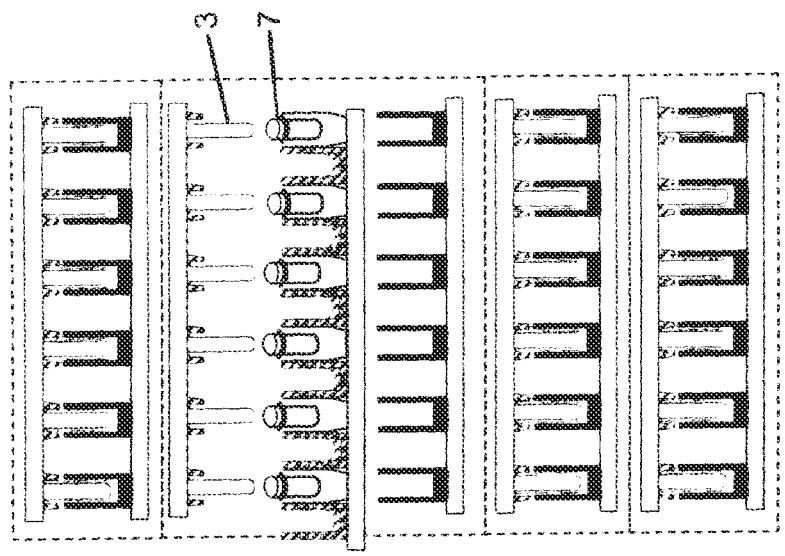
Figure 8
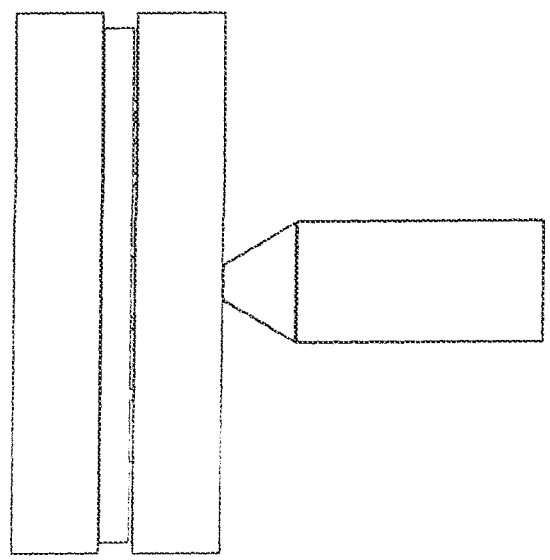

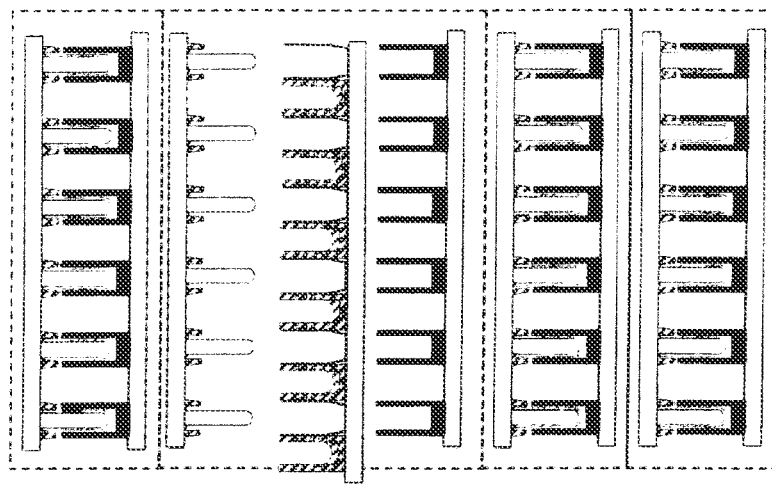
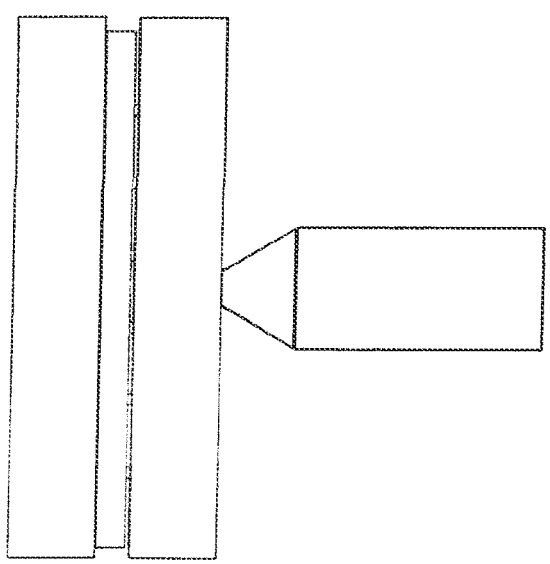
Figure 9

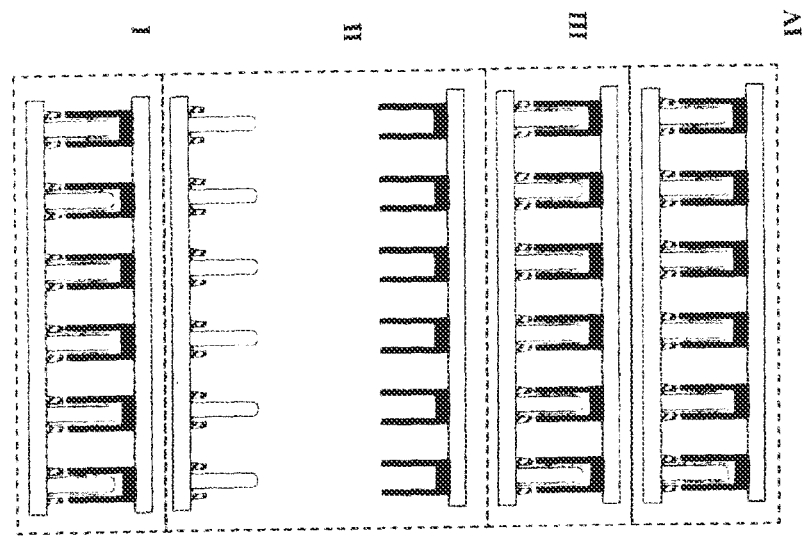
Figure 10
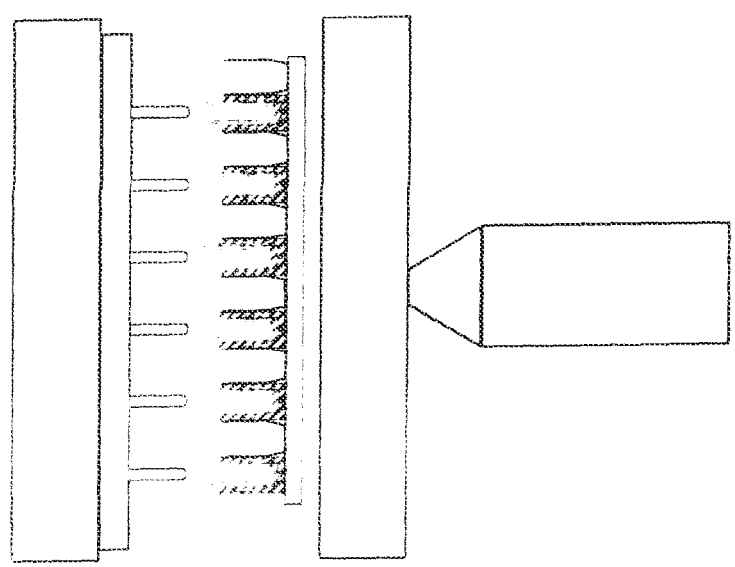

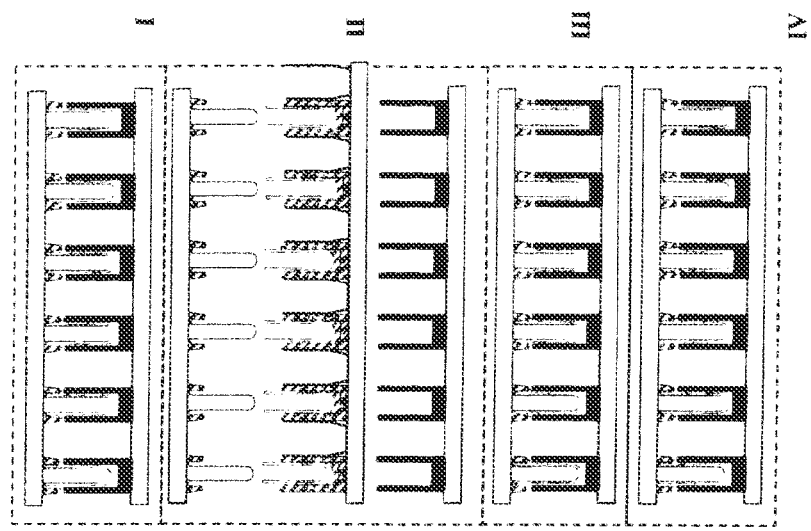
Figure 11
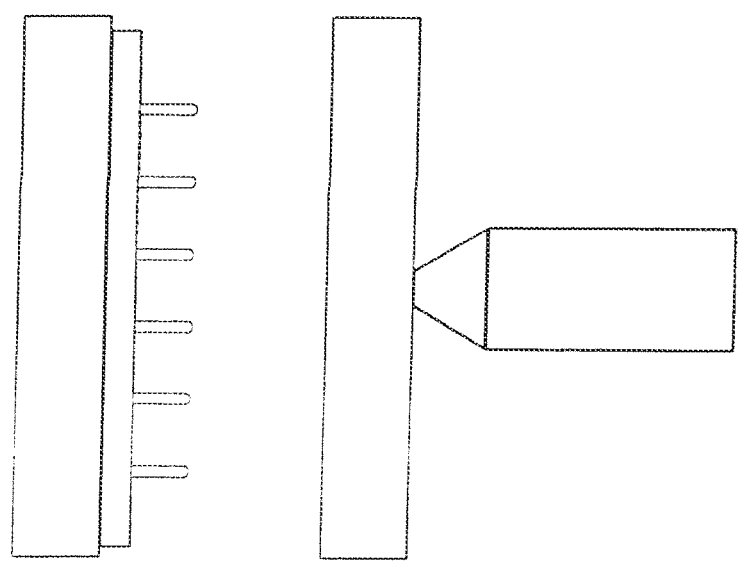

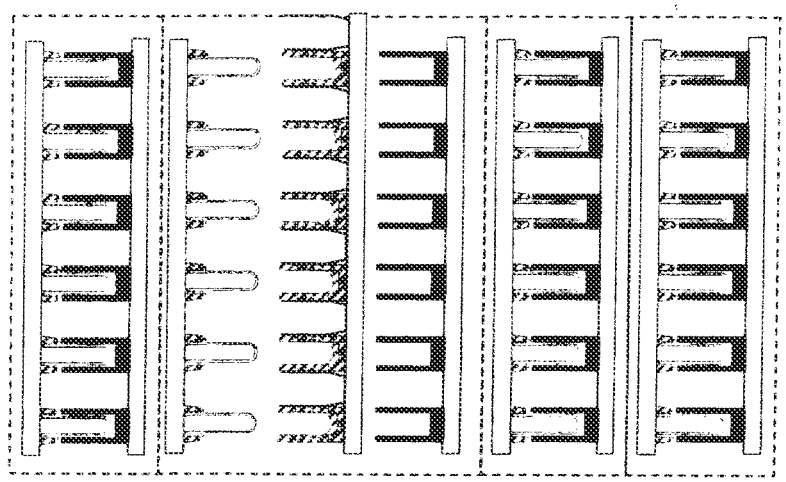
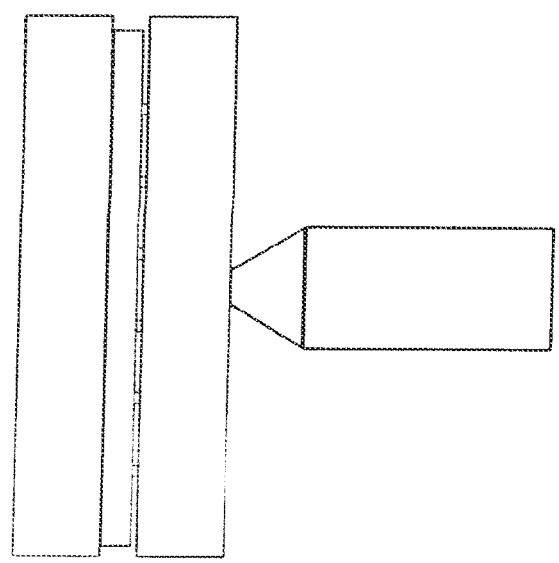
Figure 12

POSITIONING DEVICE

BACKGROUND OF THE INVENTION

The present invention concerns a positioning device for after-treatment tools for the after-treatment of parisons produced in an injection molding mold and a system having such a positioning device.

Injection molding is one of the most important processes for the production of moldings or mold parts. In that case the molding material is heated, plasticised and urged under high pressure into a suitable mold tool. The molding material hardens in the mold tool and is then removed from the opened tool.

Commercially available PET bottles are generally produced by stretch blow molding of a hollow body preform or hollow body parison. In that case the hollow body parison is produced in a first step by means of injection molding. The stretch blow molding operation which follows the injection molding procedure can be effected either directly after production of the hollow body parison or at a later time.

The manufacture of the corresponding injection molding molds requires a high level of expenditure as the injection molding mold on the one hand must be designed for very high pressures while on the other hand it must also have suitably heated and/or cooled passages.

Usually an injection molding tool for the production of PET parisons comprises a multiplicity of, for example 96, cavities, into which suitably designed tool cores are introduced. When the tool is closed, that is to say when the core is fitted into the corresponding cavity, a space, referred as the molding space, is formed between the core on the one hand and the cavity on the other hand. The plasticised plastic material, for example PET, is then injected into that space under high pressure. As soon as the PET parison has sufficiently cooled down the mold can be opened and the parison removed.

To reduce the cycle times, that is to say the time from one injection molding operation to the next, it is already usual for the preform to be removed from the mold at a very early moment in time at which the preform is already solid at its outside surfaces, but the internal region thereof, referred to as the core region, is still fluid. In that state the parison is generally transferred into what is referred to as a receiving plate comprising a group of receiving cavities. Thus for example in the case of what are referred to as vertical tools, that is to say those injection molding tools which open by a vertical movement of the one tool portion relative to the other, it is usual for the tool mold to be already opened after for example 10 seconds, for a receiving plate with suitable receiving cavities to be moved into the mold, for the individual preforms to be allowed to drop into the receiving cavities under the effect of the force of gravity, for the receiving plate with the preforms to be moved out of the tool, for the mold to be closed again and for the next injection molding operation to begin. During the next injection molding operation the previous preforms remain in the receiving cavity which is usually cooled.

Embodiments are also known in which the individual preforms are removed from the mold by means of a gripper unit and transferred into the receiving plate arranged outside the tool mold.

As the parison must remain in the receiving cavity of the state of the art for a comparatively long time for cooling purposes so that generally the next parison can already be removed from the injection molding tool before the parison has cooled in the receiving cavity to such an extent that it can be removed without the risk of damage, it is already usual to use receiving plates having a plurality of groups of receiving cavities, wherein each group has as many receiving cavities as the injection molding tool produces parisons in each injection cycle. The individual receiving cavity groups are then fitted with parisons in succession so that the individual parison can remain in the receiving cavity for longer than an injection molding cycle.

Such receiving plates however are correspondingly large and can only be controlled with very great complication and effort.

To further reduce the cycle time, considerable endeavors have been undertaken in recent years to already remove the preform from the injection molding mold at a very early time. As the preform is still relatively soft at such an early time higher demands are made on the after-treatment. Thus it has occasionally already been proposed that the parison held in the receiving cavity is to be additionally cooled or aftertreated with an after-treatment pin which is introduced into the parison. In the known devices with an after-treatment pin however that is only briefly moved into the parison.

WO 03/097326 already discloses a device for the after-treatment of parisons produced in an injection molding mold. That machine has a tool block with two different groups of tool cores. In addition, there are four receiving plates which are arranged on a cube, as well as two pin plates. After the parisons have been produced in the injection molding machine the machine is opened and the tool block rotated in such a way that the other group of tool cores can cooperate with the tool cavities. The parisons produced by means of injection molding are now on the free tool cores. From there they are now transferred into a receiving plate having suitable receiving cavities. The receiving cube with the individual receiving plates is then turned through 90° and a pin plate is briefly introduced into the parisons. Thereafter the pin plate is removed again and the receiving cube is turned through a further 90° and another pin plate is again introduced into the parisons.

The provision of a plurality of after-treatment tools comprising receiving cavities and/or receiving fingers however means that generally a complicated and expensive robot unit is necessary for positioning the individual after-treatment tools.

BRIEF SUMMARY OF THE INVENTION

Taking that state of the art as the basic starting point therefore the object of the present invention is to provide a system for the after-treatment of parisons produced in an injection molding mold, by means of which a plurality of after-treatment tools can be easily positioned.

That object is attained by a system for the after-treatment of parisons produced in an injection molding mold, comprising at least two after-treatment tools, wherein there is provided a positioning device for positioning the first after-treatment tool in at least one positioning direction, and the at least two after-treatment tools are connected together so that with the positioning device for positioning the first after-treatment tool at least one further after-treatment tool can be positioned by suitable positioning of the first after-treatment tool.

Preferably, each after-treatment tool has an opening and closing device for moving a pin plate (6) and a receiving plate (4) between an open position and an after-treatment position and the opening and closing device are arranged in mutually collinear orientation. The opening and closing device is usually a stroke device. Desirably, the at least two after-treatment tools are arranged in mutually juxtaposed relationship in the positioning direction, wherein a receiving plate of an after-treatment tool is connected to a pin plate of another after-treatment tool. The positioning device usually includes a linear drive which may include a servomotor. The at least two after treatment tools are usually arranged displaceably on rails.

A guide element is usually provided for guiding the molding out of an after-treatment tool which, when the after-treatment tool is opened, can be moved between the receiving plate and the pin plate of the after-treatment tool. The guide element is usually includes a substantially U-shaped rail and may be provided at a device for transferring the parisons from the injection molding mold into the after-treatment tools.

The invention includes a system where there is only one opening and closing device and at least one after-treatment tool has a locking device that prevents opening of the corresponding after-treatment tool in a locked position.

In such a system having a single opening and closing device, after-treatment tools may be arranged in mutually juxtaposed relationship in the positioning direction in a row. The positioning device then engages the first after-treatment tool in the row and the opening and closing device engages the last after-treatment tool in the row so that the row of after-treatment tools can be positioned by actuation of the positioning device and by unlocking of the locking device for an after-treatment tool and locking of the locking device for all other after-treatment tools in the row, actuation of the opening device thus opens only the unlocked after-treatment tool.

BRIEF DESCRIPTION OF THE SEVERAL VIEWS OF THE DRAWINGS

FIGS. 5 through 13 show a diagrammatic view of the mode of operation of a second embodiment.

DETAILED DESCRIPTION OF THE INVENTION

Figure 1:
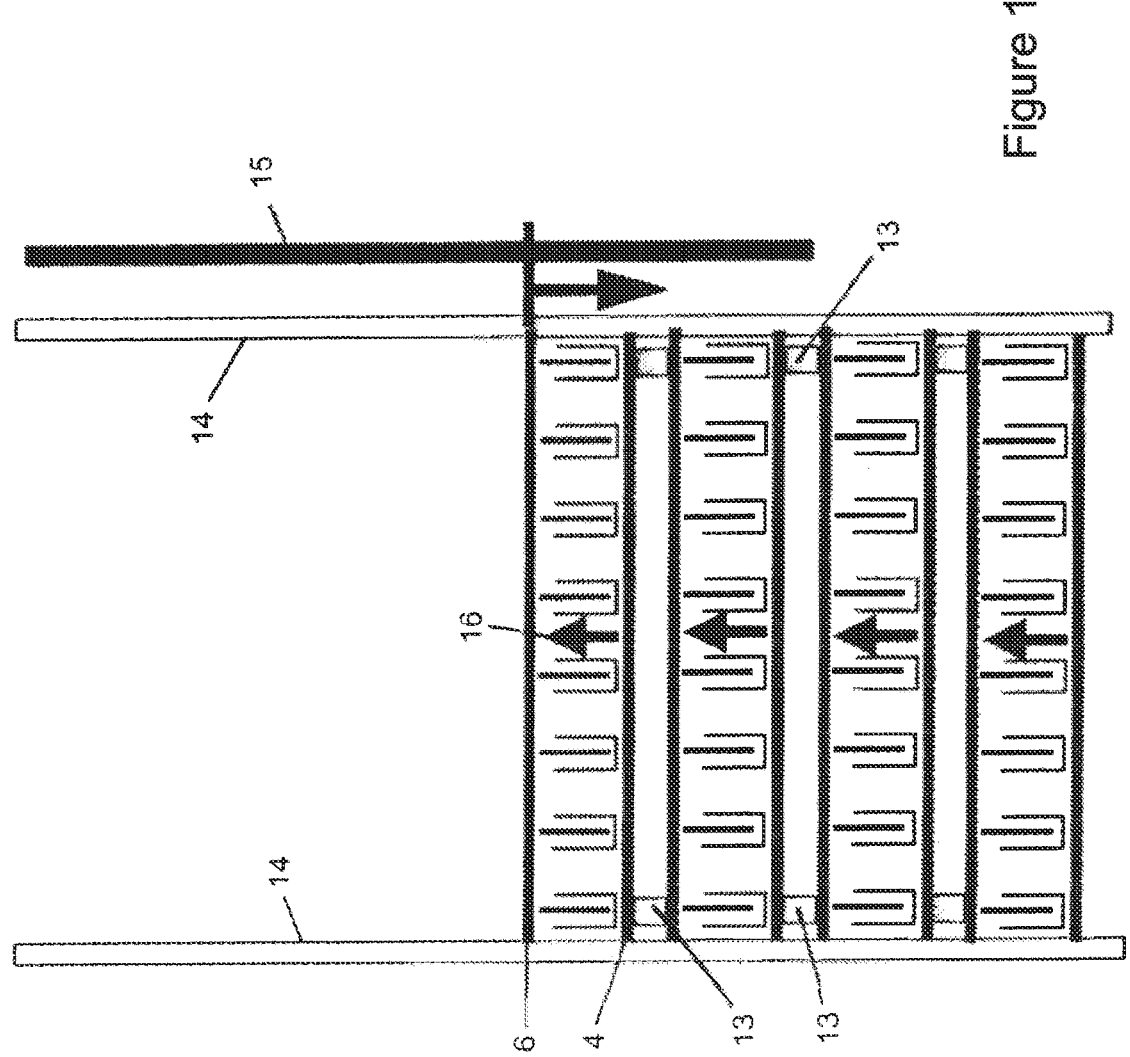
FIGS. 1 through 4 show a diagrammatic view of the mode of operation of a first embodiment.

The term after-treatment tool is used to denote a receiving cavity, a receiving finger or a system consisting of a receiving cavity and a receiving finger, into or onto which the parison is transferred after removal from the injection molding tool for the purposes of after-treatment, for example for aftercooling and/or aftershaping. It will be appreciated that the after-treatment tool can also comprise a group of receiving cavities, receiving fingers or pairs of a receiving cavity and a receiving finger.

By way of example a preferred embodiment provides that each after-treatment tool has a receiving plate which has a group of receiving cavities and a pin plate having a group of after-treatment pins. In addition there can be provided a device for transferring the parisons from the injection molding mold alternately into the at least two after-treatment tools, wherein the pin plate and the receiving plate of each after-treatment tool are reciprocatable relative to each other between an open position in which the after-treatment pins are arranged outside the receiving cavities and an after-treatment position in which the after-treatment pins are at least partially arranged in the receiving cavities.

In a preferred embodiment each after-treatment tool has an opening and closing device for moving the pin plate and the receiving plate between the open position and the after-treatment position.

It has proven to be desirable if the positioning device and the opening and closing device are arranged in mutually collinear orientation.

Furthermore a preferred embodiment provides that the at least two after-treatment tools are arranged in mutually juxtaposed relationship in the positioning direction, wherein the receiving plate of an after-treatment tool is connected to the pin plate of another after-treatment tool.

When now the opening and closing device of an after-treatment tool is actuated, the result of this is that the receiving plate and all further after-treatment tools mounted thereto move relative to the pin plate and all further after-treatment tools mounted thereto.

By way of example the positioning device can comprise a linear drive, preferably a servomotor. The at least two after-treatment tools can be arranged displaceably on rails.

In a preferred embodiment the opening and closing device is a stroke device. By way of example it is possible here to use a pneumatic cylinder or an electric drive.

As an alternative thereto is also possible to provide only one opening and closing device. In that case it is advantageous if the opening directions of all after-treatment tools are oriented in the positioning direction, all after-treatment tools are arranged in mutually juxtaposed relationship in the positioning direction in a row, the positioning device is connected to the first after-treatment tool of the row and the opening and closing device is connected to the last after-treatment tool of the row. It is further desirable if all after-treatment tools have a locking device which in the locked position prevents opening of the after-treatment tool. Depending on which respective after-treatment tool is to be opened the locking device in question can then be released. When now the opening and closing device is actuated it "pulls" at the one end of the row of after-treatment tools while the positioning device "holds fast" the other end of the row. Consequently the after-treatment tool which is unlocked will open. It is therefore possible to position and open a multiplicity of after-treatment tools with only one positioning device and only one opening and closing device.

Furthermore there can be provided a guide element for guiding the molding out of the after-treatment tool which when the after-treatment tool is opened can be moved between the receiving plate and the pin plate of the after-treatment tool. The guide element ensures that the parisons are guided upon ejection from the after-treatment tool.

In that case the guide element can be a substantially U-shaped rail. Optionally discharge of the parisons can also be accelerated by the provision of a compressed air source or a vacuum source.

In a particularly preferred embodiment the guide element is provided at the device for transferring the parisons from the injection molding mold into the after-treatment tools.

Further advantages, features and possible uses of the present invention will be clearly apparent from the description hereinafter of preferred embodiments and the accompanying Figures.

FIGS. 1 through 4 show diagrammatic views from above onto a first embodiment of a system according to the invention for the after-treatment of parisons produced in an injection molding mold.

The after-treatment system according to the invention here comprises four after-treatment tools which each comprise a receiving plate 4 and a pin plate 6.

It will be clear that, in the construction according to the invention, precisely one pin plate is associated with each receiving plate, the after-treatment pins of the pin plate remaining within the receiving cavities of the receiving plate during the entire after-treatment process.

All after-treatment tools are arranged in mutually juxtaposed relationship, wherein a receiving plate 4 is always connected by way of connecting units 13 to a pin plate 6 of the adjacent after-treatment tool.

An after-treatment tool (in the illustrated example the uppermost after-treatment tool) is connected to a linear drive 15. By means of the linear drive, the entire block consisting of all after-treatment tools can be moved in a direction (in the illustrated example the horizontal direction). The double-headed arrow shown in broken line is intended to denote the line of movement of a transfer device, by means of which the parisons are transferred from the injection molding tool into the after-treatment tools. As the parisons are to be transferred successively into the respective after-treatment tools, the block of after-treatment tools can be displaced by means of the linear drive 15 in such a way that the after-treatment tool in question comes to lie directly in front of the line of movement of the transfer device. All after-treatment tools are held on rails 14.

In addition each after-treatment tool has a stroke device 16, by means of which the respective after-treatment tool can be moved from the after-treatment position into the opened position.

Figure 2:
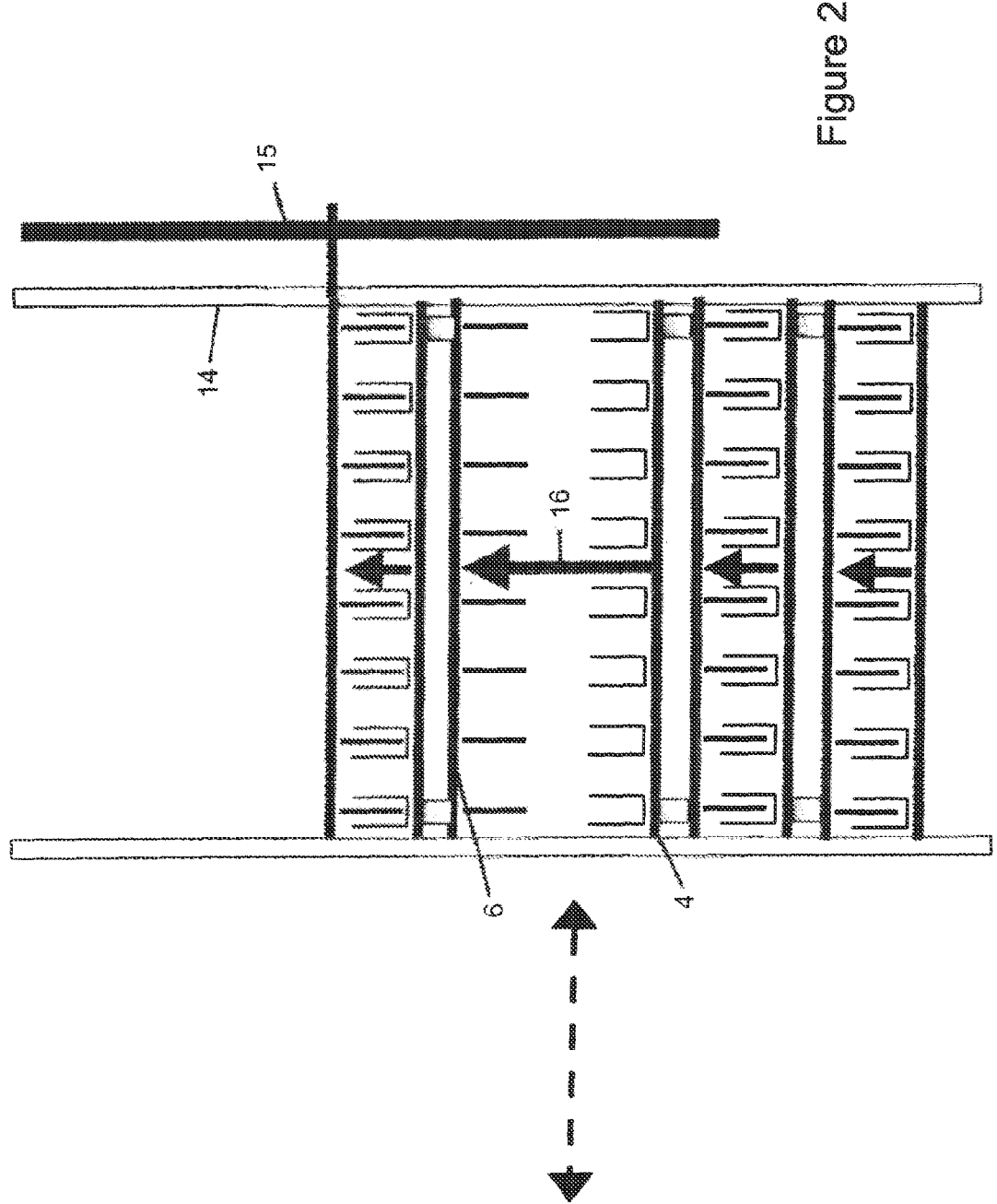
Figure 3:
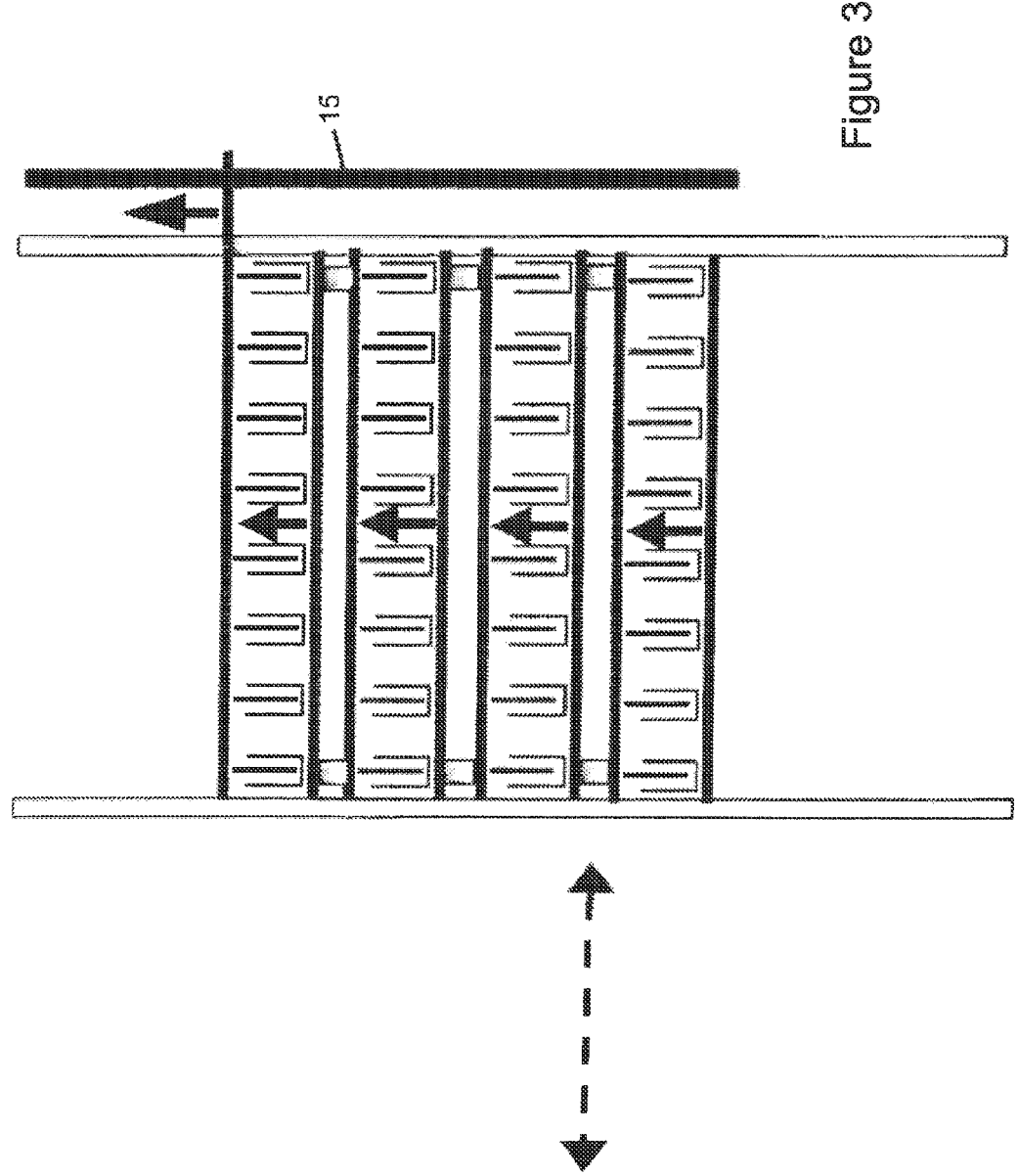

The sequence of movements is now described in diagrammatic form with reference to FIGS. 1 through 4. In FIG. 1 the block of after-treatment tools has been displaced by means of the linear drive in such a way that the line of movement of the transfer device comes to lie in front of the second after-treatment tool (in the Figure, the second from the top). The second after-treatment tool can now be opened by means of the stroke device 16. That condition is shown in FIG. 2. Now, any preforms possibly present in the after-treatment tool can be removed and a new set fitted with preforms. The after-treatment tool is then closed again and the block of the after-treatment tools displaced by means of the linear drive in such a way that now the line of movement of the transfer device comes to lie in front of the third after-treatment tool (in the Figure, the second from the bottom). That situation is shown in FIG. 3.

Figure 4:
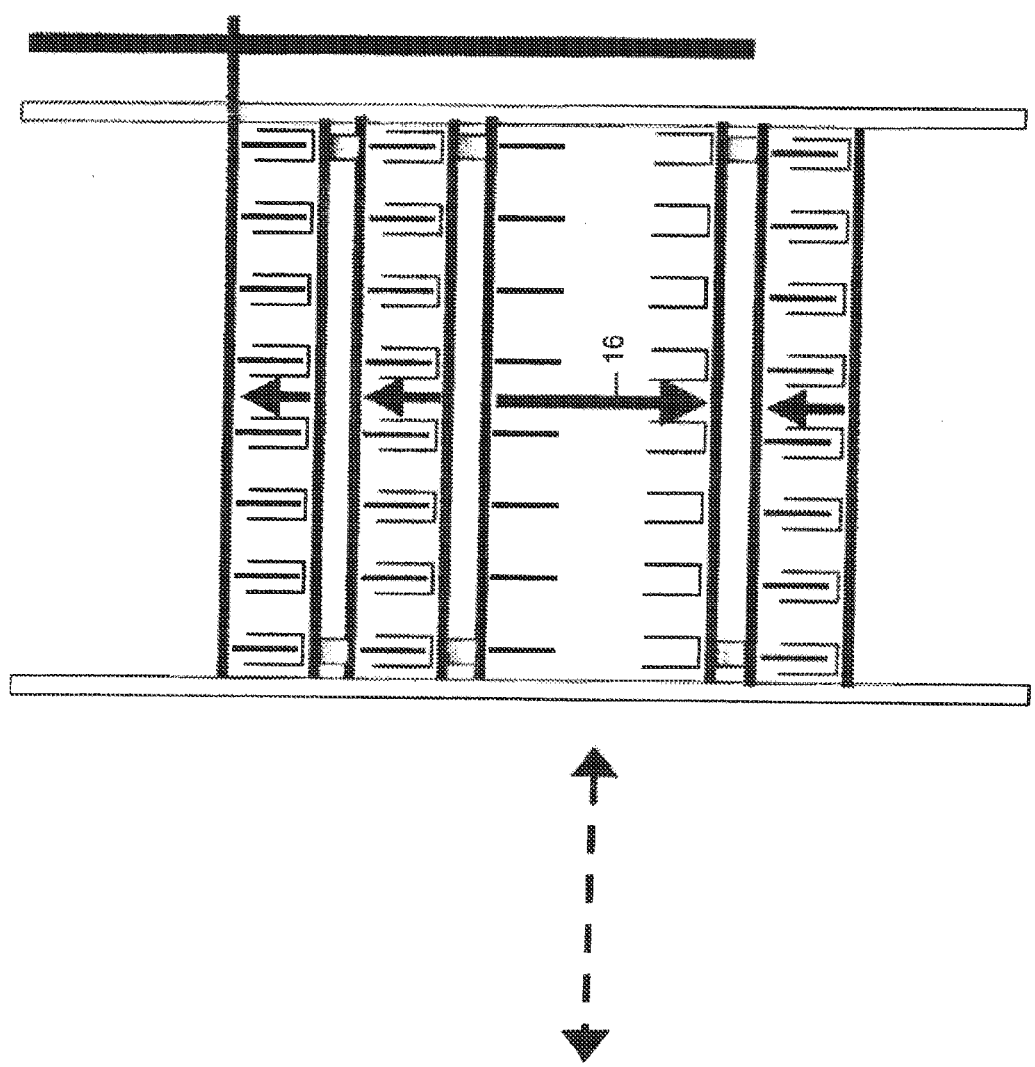
Figure 5:
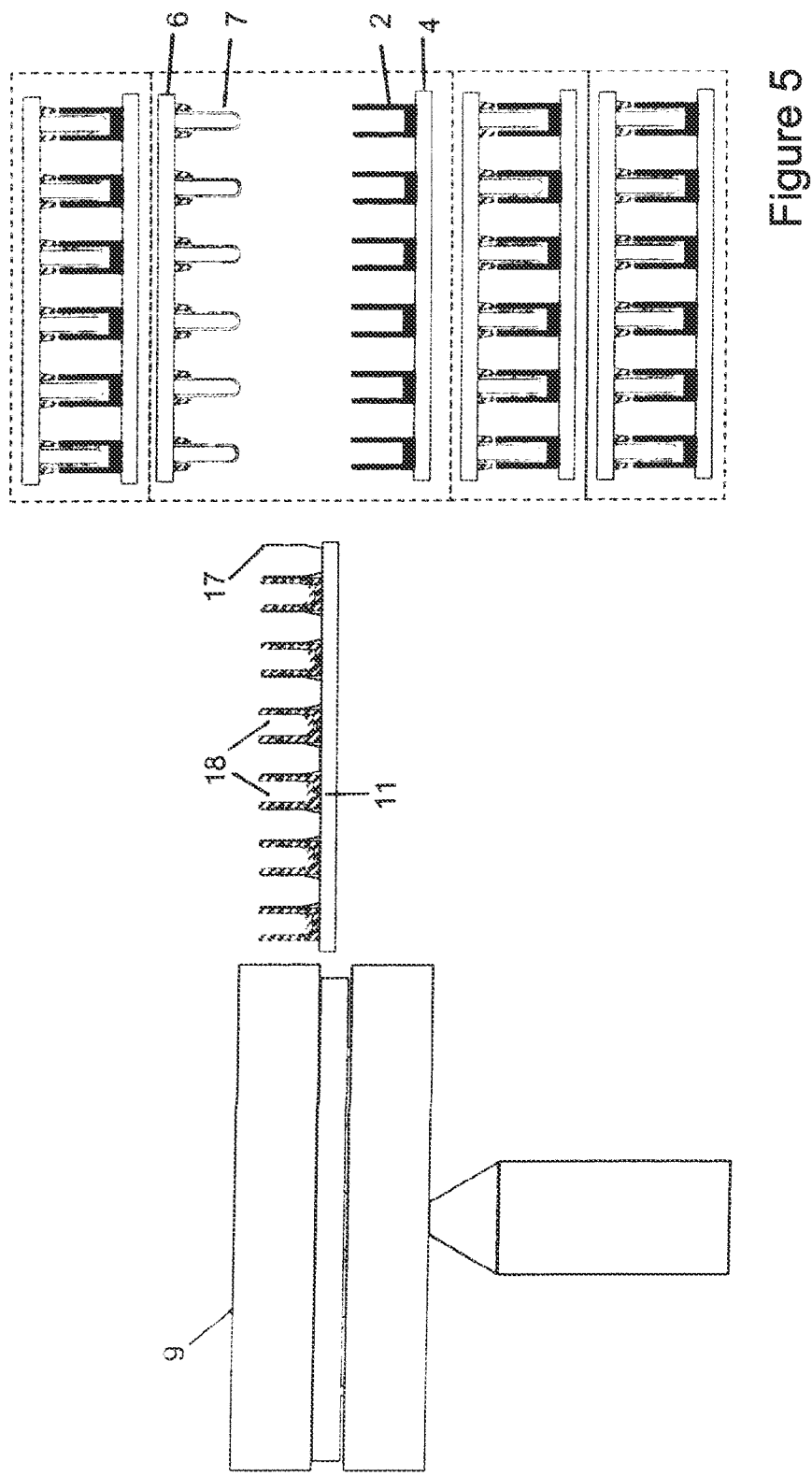

Finally FIG. 4 shows the situation which occurs after actuation of the corresponding stroke device 16 for opening the third after-treatment tool.

FIGS. 5 through 13 show a second embodiment. Here too, the Figures show views from above, that is to say the injection molding tool is a horizontal tool in respect of which the tool is opened by a horizontal relative movement of the tool portions relative to each other.

FIG. 5 again shows a block comprising four after-treatment tools each having a cavity plate 4 and a pin plate 6. The second after-treatment tool II is just opened and the parisons 7 are arranged on the pins 3 of the pin plate 6 (held for example by means of a vacuum device).

A gripper device 11 which here has a row of transfer cavities 18 and guide rails arranged therebetween can be moved both into the opened tool mold 9 and also into an opened after-treatment tool.

FIG. 6 shows a situation in which the gripper device 11 is within the opened after-treatment tool 11. The gripper device 11 is so arranged that the guide rails 17 are arranged directly opposite the parisons 7 to be removed.

Now, as shown in FIGS. 7 and 8, the preforms 7 can be ejected for example by means of compressed air from the pins and fall along the guide rails 17. The guide rail can possibly also be acted upon by compressed air to ensure speedy removal of the preforms 7 from the guide rails 17.

The gripper unit 11 is then moved out of the after-treatment tool and into the opened tool mold 9 so that a fresh group of parisons 7 can be transferred into the transfer cavities 18, as shown in FIGS. 9 and 10.

Figure 13:
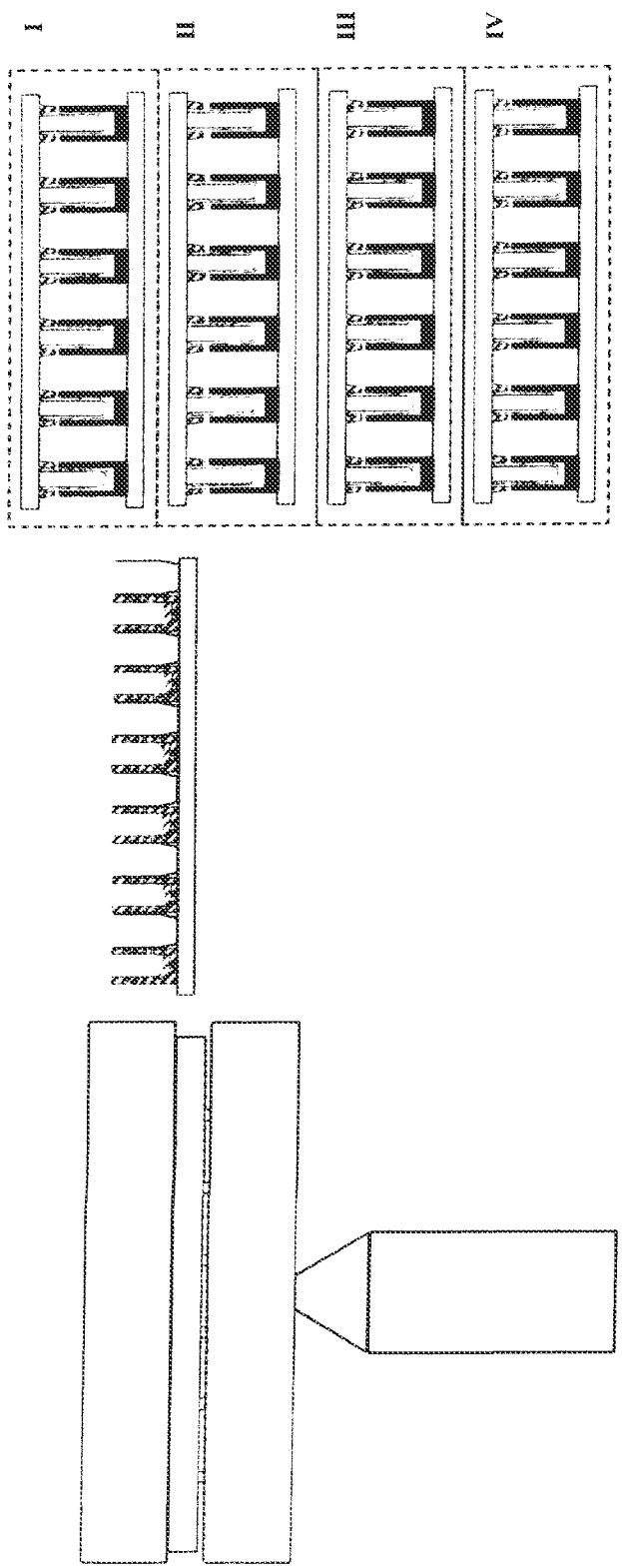

The gripper unit 11 then moves into the after-treatment tool again, in which case the transfer cavities 18 this time come to lie opposite the pins (FIG. 11). The parisons are transferred onto the pins (FIG. 12) and the gripper unit 11 moves out of the after-treatment tool so that the tool can close and the after-treatment can begin in the after-treatment tool (FIG. 13).

Figure 14:
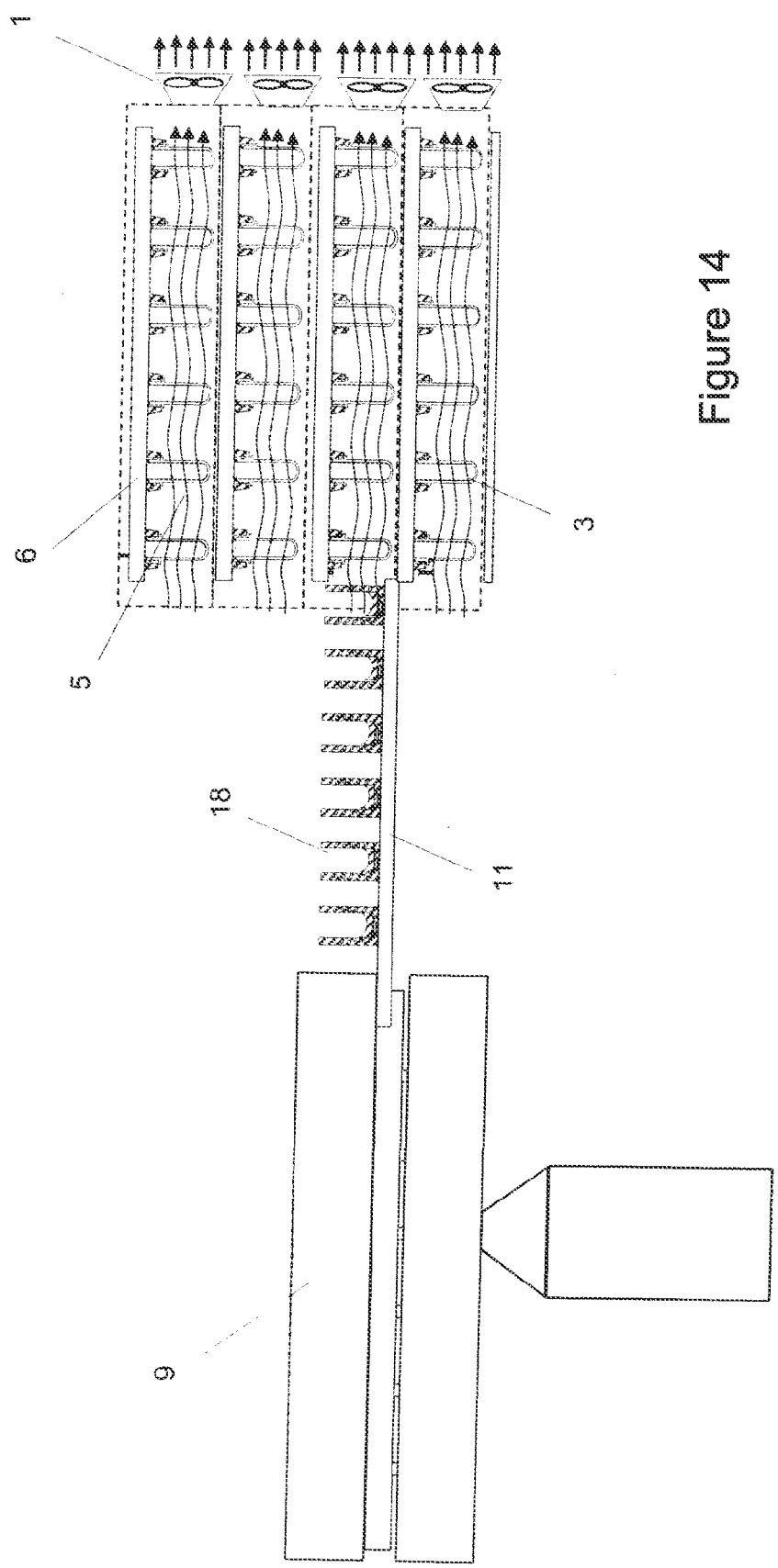
FIGS. 14 through 16 show a diagrammatic view of the mode of operation of a third embodiment.
Figure 15:
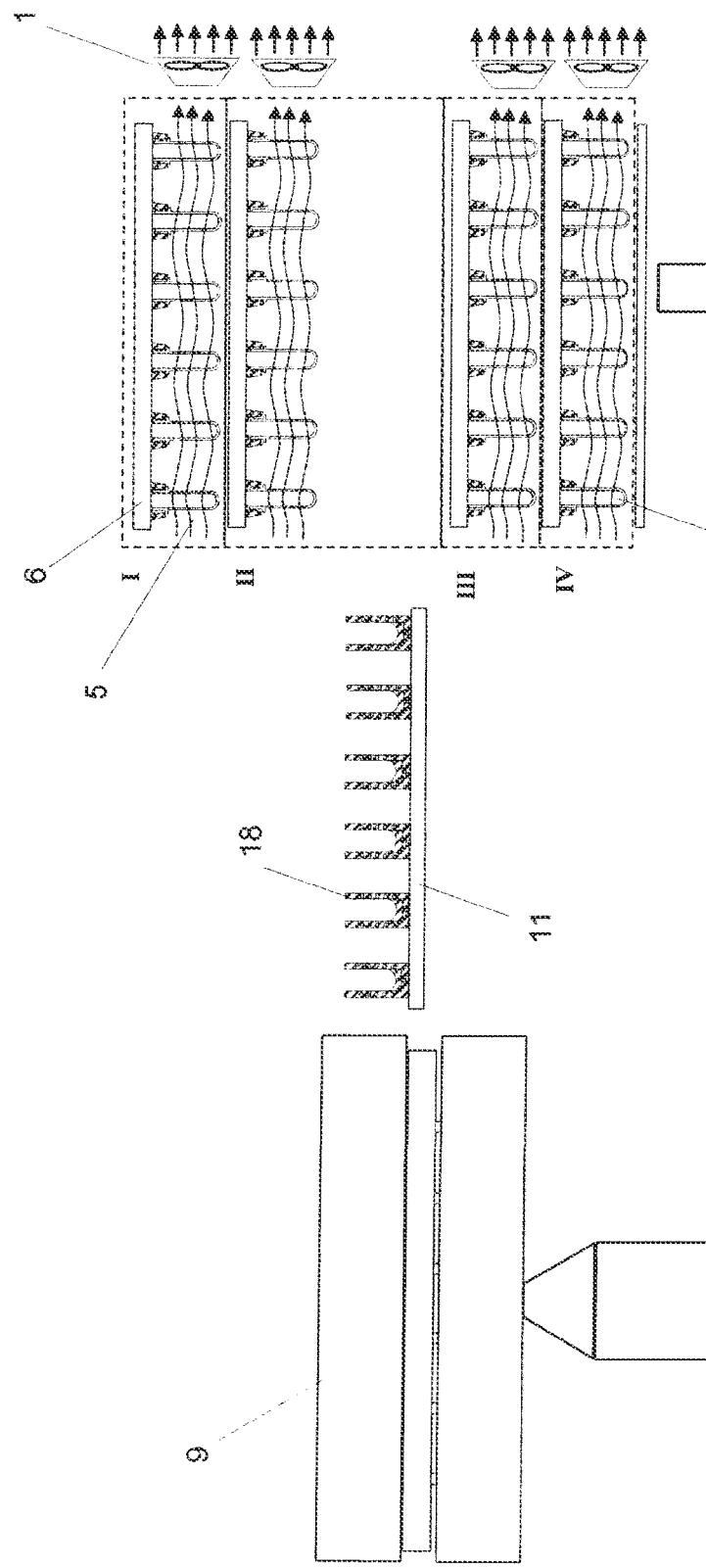
Figure 16:
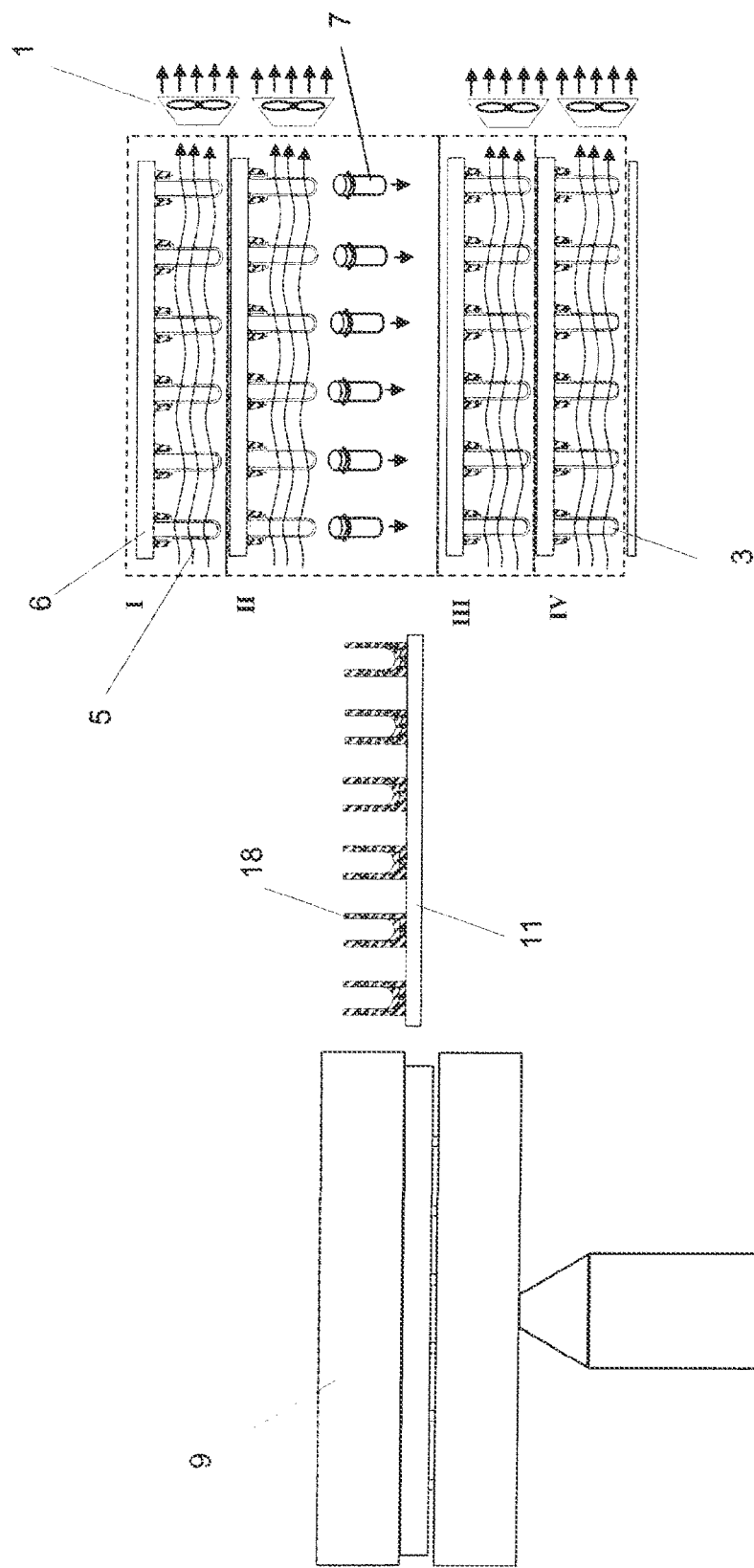

FIGS. 14 through 16 show views from above onto a third embodiment of the invention. This embodiment differs from the previous embodiments substantially in that the receiving tool only comprises a pin plate 6. It was possible here to dispense with the receiving cavities. Cooling of the outside of the preforms 7 is effected here by means of fans which provide that, when the tool is closed, the preforms 7 are subjected to the action of an air flow 5. So that the air flow 5 effectively cools the preforms it is necessary for the after-treatment tools to be held closed. In the closed condition shown in FIG. 14 for all after-treatment tools the preforms 7 are disposed so-to-speak between two plates, the mutual spacing of which is only slightly larger than the length of the preform so that the air flow 5 is obliged to flow past the preforms.

In the condition shown in FIG. 14 all after-treatment tools are fitted with parisons 7. As soon as the after-treatment of the parisons 7 is terminated in an after-treatment tool the after-treatment tool (the after-treatment tool identified by reference II in FIG. 15) is opened by means of the opening and closing device so that the parisons 7 can be ejected (FIG. 16).

Figure 17:
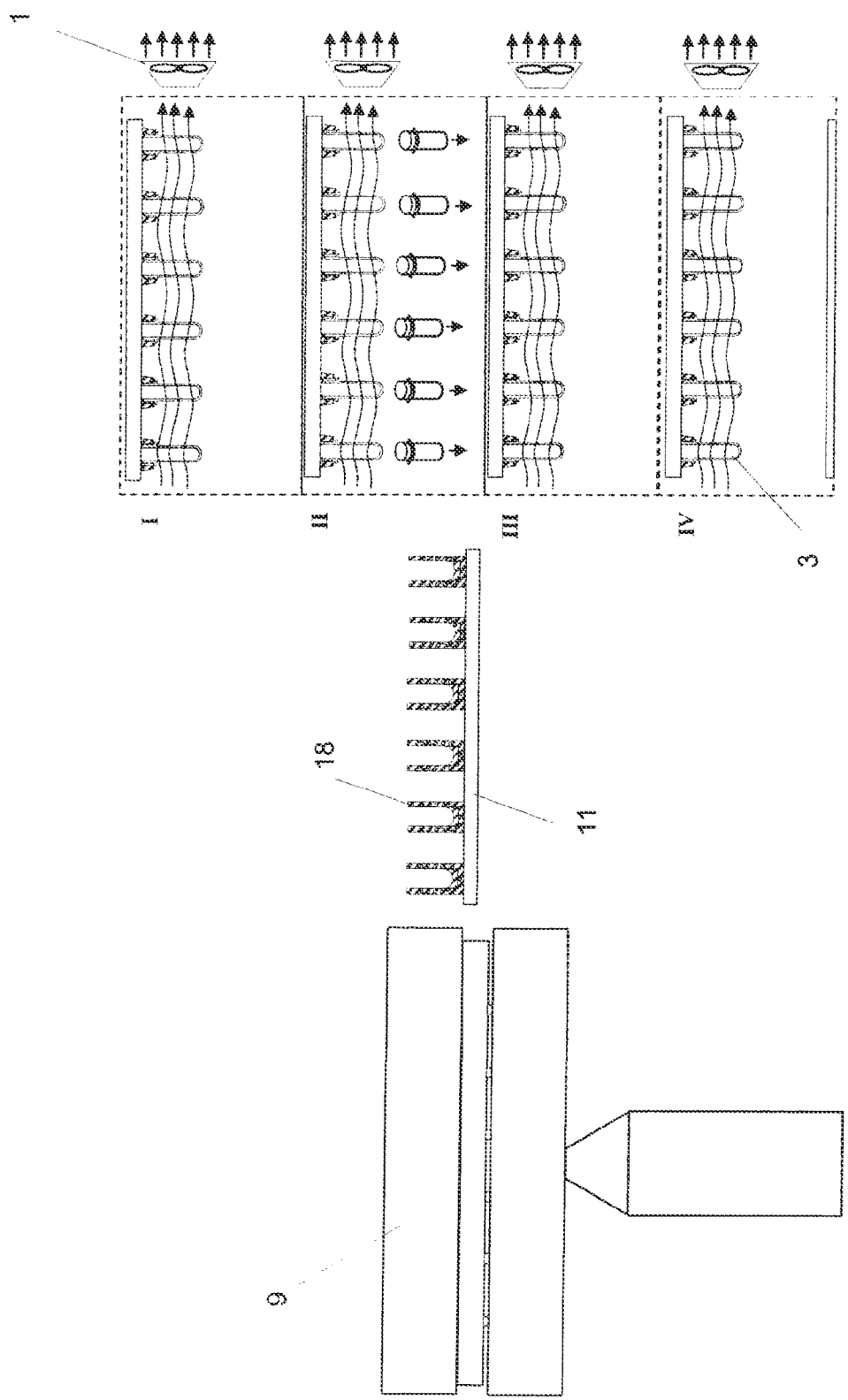
FIG. 17 shows a diagrammatic view of a fourth embodiment.

It will be appreciated that it is also possible to completely dispense with an opening and closing device. Such a construction (fourth embodiment) is shown in FIG. 17. Here the individual pin plates 6 are at a fixed spacing relative to each other, which permits ejection of the parisons 7 from the after-treatment tools. By virtue of the fact that the fans 1 are connected to the pin plates 6, a certain cooling for the outside of the parisons 7 by the air flow 5 is achieved even with such large spacings between adjacent pin plates.

List of References
1 fans
2 receiving cavity
3 after-treatment pin
4 receiving plate
5 air flow
6 pin plate
7 parison
9 tool mold
11 gripper elements
13 connecting unit
14 rail
15 linear drive
16 stroke device
17 guide rail
18 transfer cavity

What is claimed is:

1. A system for the after-treatment of parisons (7) produced in an injection molding mold, comprising at least two after-treatment tools, wherein each after-treatment tool has a receiving plate that has a group of receiving cavities and a pin plate having a group of after treatment pins wherein there is provided a positioning device for positioning the first after-treatment tool in at least one positioning direction, wherein the at least two after-treatment tools are connected together so that a further of the at least two after-treatment tool can be positioned by suitable positioning of the first after-treatment tool.

2. A system as set forth in claim 1 wherein each after-treatment tool has an opening and closing device for moving a pin plate (6) and a receiving plate (4) between an open position and an after-treatment position.

3. A system as set forth in claim 2 wherein the positioning device and the opening and closing device are arranged in mutually collinear orientation.

4. A system as set forth in claim 1 wherein the at least two after-treatment tools are arranged in mutually juxtaposed relationship in the positioning direction, wherein a receiving plate of an after-treatment tool is connected to a pin plate of another after-treatment tool.

5. A system as set forth in claim 1 wherein the positioning device comprises a linear drive.

6. A system as set forth in claim 5 wherein the linear drive comprises a servomotor.

7. A system as set forth in claim 1 wherein the at least two after treatment tools are arranged displaceably on rails.

8. A system as set forth in claim 2 wherein the opening and closing device is a stroke device.

9. A system as set forth in claim 1 wherein a guide element is provided for guiding the molding out of an after-treatment tool which when the after-treatment tool is opened can be moved between the receiving plate and the pin plate of the after-treatment tool.

10. A system as set forth in claim 9 wherein the guide element is a substantially U-shaped rail.

11. A system as set forth in claim 9 wherein the guide element is provided at the device for transferring the parisons from the injection molding mold into the after-treatment tools.

12. A system as set forth in claim 1 wherein there is only one opening and closing device.

13. A system as set forth in claim 1 wherein at least one after-treatment tool has a locking device that prevents opening of the corresponding after-treatment tool in a locked position.

14. A system as set forth in claim 13 wherein the after-treatment tools are arranged in mutually juxtaposed relationship in the positioning direction in a row, the positioning device engages the first after-treatment tool in the row and an opening and closing device engages the last after-treatment tool in the row so that the row of after-treatment tools can be positioned by actuation of the positioning device and by unlocking of the locking device for an after-treatment tool and locking of the locking device for all other after-treatment tools in the row and actuation of the opening device thus opens only the unlocked after-treatment tool.

* * * * *